No. 12,397. REISSUED NOV. 7, 1905.
P. A. DEASY.
WATER HEATING APPARATUS.
APPLICATION FILED MAY 2, 1905.
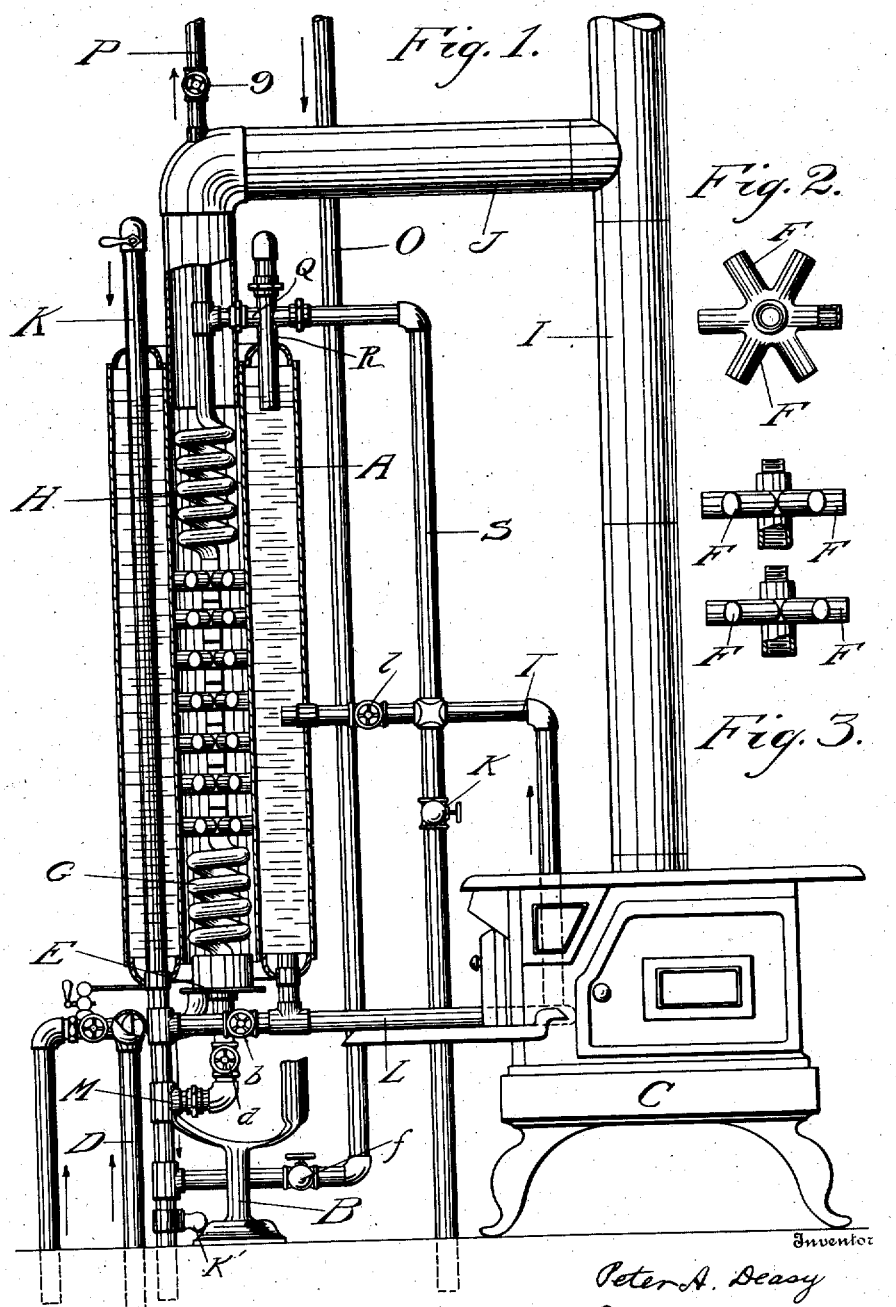
Witnesses
F. Lassberg.
Bessie Gorfinkel.
Inventor
Peter A. Deasy
By F. M. Wright.
Attorney

UNITED STATES PATENT OFFICE.

PETER A. DEASY, OF OAKLAND, CALIFORNIA, ASSIGNOR TO THE DEASY WATER HEATER COMPANY, OF OAKLAND, CALIFORNIA.

WATER-HEATING APPARATUS.

No. 12,397. Specification of Reissued Letters Patent. Reissued Nov. 7, 1905.

Original No. 765,652, dated July 19, 1904. Application for reissue filed May 2, 1905. Serial No. 258,409.

*To all whom it may concern:*

Be it known that I, PETER A. DEASY, a citizen of the United States of America, residing in the city of Oakland, county of Alameda, State of California, have invented certain new and useful Improvements in Water-Heating Apparatus; and I do hereby declare that the following is a full, clear, and exact description of said invention, such as will enable others skilled in the art to which it most nearly appertains to make, use, and practice the same.

My invention relates to an improved apparatus for heating and supplying hot water to a house, in which apparatus there is a plurality of heating means; and it consists of an annular boiler having a passage or space through its center extending from its bottom to its top. Inside of this internal passage or space I place a water-heater which extends from the bottom to the top of the space and fills it entirely. The bottom of the water-heating device is connected with the main water-supply, while its upper end is connected with the top of the boiler and with a solar heater on the roof of the house. The upper end of the space within the boiler is connected by a flue with a chimney or stovepipe-flue, and provisions are made for connecting the boiler with the water-back of a stove, while the heater in the annular space is heated by a gas-burner below the space and heater, all as hereinafter more fully described.

Referring to the accompanying drawings, Figure 1 is an elevation of my water-heating apparatus, showing the boiler in section. Fig. 2 is a bottom view of one of the heater-sections, and Fig. 3 is a side view of two of the heater-sections.

Let A represent a hot-water boiler which I make annular in form, with a central space of uniform diameter extending from its bottom to its top. This annular boiler I mount on a tripod B or other support in a convenient locality near a common cook-stove C.

Inside of the central space I place a water-heating device which extends entirely through it and fills the space from the top to the bottom of the boiler. This inclosed water-heater may be of any convenient form; but the one which I have shown consists of a series of castings with radiating arms F, connected by a central tube, the exterior shape of which conforms to and fits in the annular space, as shown at Fig. 2. This style of heater may be used throughout the length of the space in the boiler, or other forms of heaters could be combined with it. In the drawings I have shown a radial-armed heater, such as is above described, occupying the middle part of the annular space and a spiral pipe-section G below it and extending down to the bottom of the space. The upper end of this spiral pipe-section connects with the central pipe of the radial-armed section, and another spiral pipe-section H connects with the upper end of the radial-armed section and fills the space between the radial-armed section and the top of the boiler, thus completely filling the central space.

The lower end of the lower spiral section G is connected with the water-main by a pipe M, which connects with the main pipe K, which latter supplies water from the water-main to the boiler. This latter pipe may pass down through the boiler or outside of it, as preferred, and is provided at a suitable point with a stop-plug *k'*.

A gas-burner E is mounted below the annular space, and an air-pipe D leads from the basement or outside of the house to supply air to support combustion of the burner.

A horizontal pipe L is connected with the pipe K just below the gas-burner and leads across below the burner and connects in the usual way with the water-back of the stove C, said pipe being also connected with the bottom of the boiler, where it passes underneath it. A cock *b* in the length of the pipe serves to shut off the supply of water to the water-back and to the boiler when desired. Said pipe M connects with the main pipe K and passes up through the gas-burner E and to the heater, and a cock *d* serves to shut off the water-supply to the inclosed heater.

From the top of the heater an extension-pipe P, which connects with the water-heating device, leads up to a solar heater on the roof of the house, said pipe passing through the elbow or bend in the flue-pipe J in its passage upward.

The arrangement of the solar heater and of the pipes leading to and from the same may be such as is shown in United States Patent, issued July 22, 1902, No. 705,167, to F. Walker, and since the particular form of solar heater forms no part of my invention I refer to the above patent to indicate the type or arrangement that is applicable.

Below the pipe M a downpipe O leads from the solar heater on the roof, the lower end of which pipe is connected with the pipe K. A cock *f* in this pipe O and a cock *g* in the extension-pipe P serve to shut off connection with the solar heater.

A horizontal pipe Q extends out from the upright pipe P directly across the top of the boiler and connects with the pipe S, and directly above the boiler a cross-pipe R is connected with the pipe Q, the lower vertical member of which pipe R passes down into the top of the boiler, while the upper vertical member of the same pipe connects with the house-pipes which supply the house with hot water. The lower end of the pipe O connects with the main supply-pipe K, and thereby completes the circulation to the solar heater. The pipe T from the water-back is connected to pipe S, as hereinafter described, and also with the boiler. A cock *k* serves to cut off the supply of water to the basement-heater when desired. By closing the cocks *k* and *b* the water is not only cut off from the basement-heater, but it is compelled to pass into the boiler and water-back. A cock *l* between the pipe S and the boiler closes the connection with the boiler.

It is evident that the solar heater and the heater in the basement may be dispensed with, in which case the pipes that connect them with the system are not used.

By this arrangement and system of heaters and pipe connections a large quantity of water can be quickly heated, because by opening all the cocks the several heating devices can be concentrated upon the water in the boiler, and by shutting off the water from one or more the capacity of the boiler is regulated according to the requirements.

The annular form of the boiler renders it not only convenient, but very effective, as the heat generated by the gas-heater is confined and entirely utilized.

Having thus described my invention, what I claim, and desire to secure by Letters Patent, is—

1. In a water-heating apparatus an annular boiler having a space extending entirely throughout the center thereof, in combination with a stovepipe having one of its ends arranged in the space of said boiler, a water-heater located within said space and in communication with the supply, a vertical pipe communicating with said water-heater at its upper end and leading through said stovepipe, a horizontal pipe connected to said vertical pipe and extending through the side of said stovepipe, and a pipe connected to said horizontal pipe and leading into the top of said boiler, and a supply-pipe K extending through the boiler and having connection with the water-heater, a connection between said pipe K and the water-back of the stove, and a pipe T connected to said water-back and said boiler.

2. In a water-heating apparatus, an annular boiler having a space extending entirely through the center, a water-heater located within said space and extending the entire length of the same, in combination with the stovepipe of the same diameter as said space and leading into the top of the same, a pipe K connected to said water-heater, a vertical pipe P connected to said water-heater, a horizontal pipe connected to the vertical pipe and a pipe R connected to the horizontal pipe and leading into the boiler, a vertical pipe S connected to said horizontal pipe, a connection between pipe K and the water-back of the stove, a pipe T leading from said water-back to the boiler and having connection with pipe S.

3. In a water-heating apparatus, the combination of an annular boiler having a space extending entirely through the center thereof, a heater in said central space, a fluid-fuel burner in the bottom of said space for heating the heater, a stove having a water-back, a connection between the bottom of the water-back and the bottom of the heater, a connection between the top of the water-back and the top of the heater, a branch pipe from said lower connection leading to the bottom of the boiler, a branch pipe from the upper connection leading to the top of the boiler, a supply-pipe connected with the lower connection, and a hot-water pipe connected with the upper connection, substantially as described.

In testimony whereof I have signed my name to this specification in the presence of two subscribing witnesses.

P. A. DEASY.

Witnesses:
FRANCIS M. WRIGHT,
BESSIE GORFINKEL.